United States Patent [19]

McIlwain

[11] Patent Number: 5,413,801
[45] Date of Patent: May 9, 1995

[54] METHOD AND APPARATUS FOR SERVING CONFECTIONARIES

[76] Inventor: Lillian P. McIlwain, 1830 Middleton Ave., Lisle, Ill. 60532

[21] Appl. No.: 684,762

[22] Filed: Apr. 15, 1991

[51] Int. Cl.⁶ .................... A47G 19/00; A47G 29/00
[52] U.S. Cl. .................... 426/420; 426/104; 426/132; 428/7; D7/610; 248/176; 211/128; 220/23.83
[58] Field of Search .............. 426/104, 132, 128, 115, 426/420; 428/7; D7/610; 108/101, 92, 94; 211/128, 205, 194, 188, 133; 40/539; 248/176; 206/457, 45

[56] References Cited

U.S. PATENT DOCUMENTS

| D. 157,495 | 2/1950 | Howe | 206/457 |
|---|---|---|---|
| D. 160,688 | 10/1950 | Brock | 220/23.83 |
| 284,721 | 9/1883 | Carl | 220/23.83 |
| 1,461,543 | 7/1923 | Pettit | 426/104 |
| 1,595,449 | 8/1926 | Carrm | 248/176 |
| 1,847,687 | 3/1932 | Biertuempfel | 428/7 |
| 2,082,671 | 6/1937 | Walker | 426/104 |
| 2,203,540 | 6/1940 | Montgomery | 428/7 |
| 2,347,041 | 4/1944 | Filsinger | 428/7 |
| 2,697,294 | 12/1954 | Zenker et al. | 428/7 |
| 3,332,787 | 9/1967 | Wagenheim | 426/104 |
| 3,843,220 | 10/1974 | Snider | 428/7 |
| 4,262,439 | 4/1981 | Dinan et al. | 211/128 |
| 4,333,974 | 6/1982 | Davis | 426/104 |
| 4,461,790 | 7/1984 | Snider | 426/104 |
| 4,844,243 | 7/1989 | Stiles | 220/23.8 |
| 4,947,722 | 8/1990 | Lewis | 428/7 |

FOREIGN PATENT DOCUMENTS 27894 of 1908 United Kingdom ............. 220/23.83

Primary Examiner—Steven Weinstein
Attorney, Agent, or Firm—Russell L. McIlwain

[57] ABSTRACT

A method and apparatus for serving confectioneries comprises a first base support member having a second support member positioned thereon. The second support member is smaller in plan than the base support member thereby defining a peripheral ledge or tier. Cupcakes or other similar confectioneries may be placed on the ledge and on top of the second support member and an illusion of a traditional multi-tiered birthday cake is created. Yet, each cupcake or confectionery is available to be readily removed by children of the earliest ages and consumed without the need for plates or utensils.

8 Claims, 1 Drawing Sheet

METHOD AND APPARATUS FOR SERVING CONFECTIONARIES

BACKGROUND OF THE INVENTION

1. Field of the Invention

The present invention relates generally to a method and apparatus for serving confectioneries and, more particularly, to a novel method and apparatus for simulating a multi-tiered birthday cake using individual cupcakes.

2. Description of the Prior Art

It has been a long held tradition to celebrate the birthdays of people who have become another year older. A typical birthday celebration, or party, might involve a gathering of the friends and relatives of the birthday person at which a birthday cake is served. The tradition of a cake with candles numbering the age of the person is an event which virtually everyone has experienced. Young children, in particular, find birthday parties to be most exciting events and they thoroughly enjoy participating in the consumption of cake. However, they may lack the manual dexterity to manipulate a fork and plate of cake without creating a mess. The atmosphere of excitement may aggravate the difficulty of their eating the cake without soiling the surroundings or their own persons. Further, cakes commonly served at birthday parties need to be properly portioned, cut and placed on plates requiring the effort of someone skilled with the hands, a facility which young children do not usually possess. The cake itself can be difficult or time consuming to make, and the whole event might require considerable clean-up when completed.

SUMMARY OF THE INVENTION

The present invention overcomes the disadvantages of the prior art in the provision of a method and apparatus for simulating a multi-tiered birthday cake using a plurality of individually contained cupcakes. A first base support member made of styrofoam has a smaller second support member positioned thereon defining a peripheral ledge or tier for receiving the cupcakes. The side wall of the base support member is decorated with a strip of lace or cake ruffle. A second and third tier may be provided by a third support member which, in turn, is smaller than the second support member. Cake ruffle is likewise fixed to the side walls of the other support members. A wood skewer is inserted vertically through the support members to hold them together, and a candle is placed on the upper end of the skewer. The cupcakes are arranged closely around the respective ledges defined by the support members and an illusion of a traditional multi-tiered birthday cake is created. Yet, each cupcake is available to be readily removed by children of even the earliest ages and consumed without the need for plates or utensils.

BRIEF DESCRIPTION OF THE DRAWINGS

The features and advantages of the invention will become apparent from the following detailed description taken in connection with the accompanying drawing wherein.

DETAILED DESCRIPTION OF THE PREFERRED EMBODIMENTS

Figure 1:
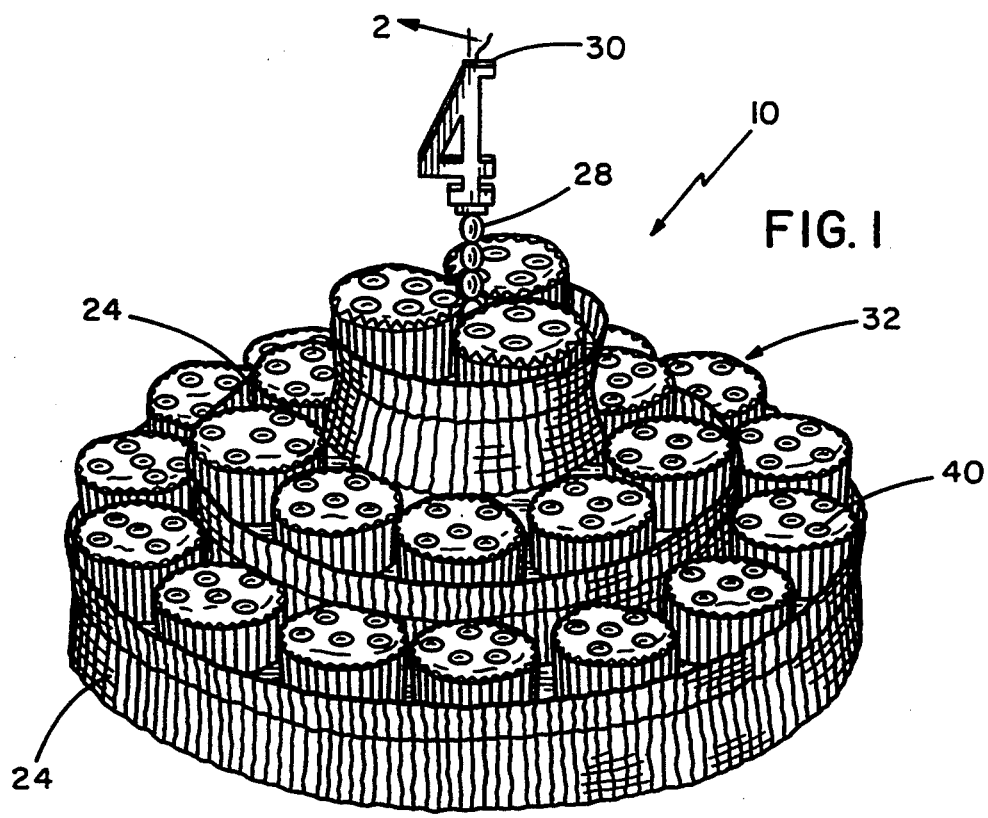
FIG. 1 is a perspective view of an apparatus for serving confectioneries constructed in accordance with the invention.
Figure 2:
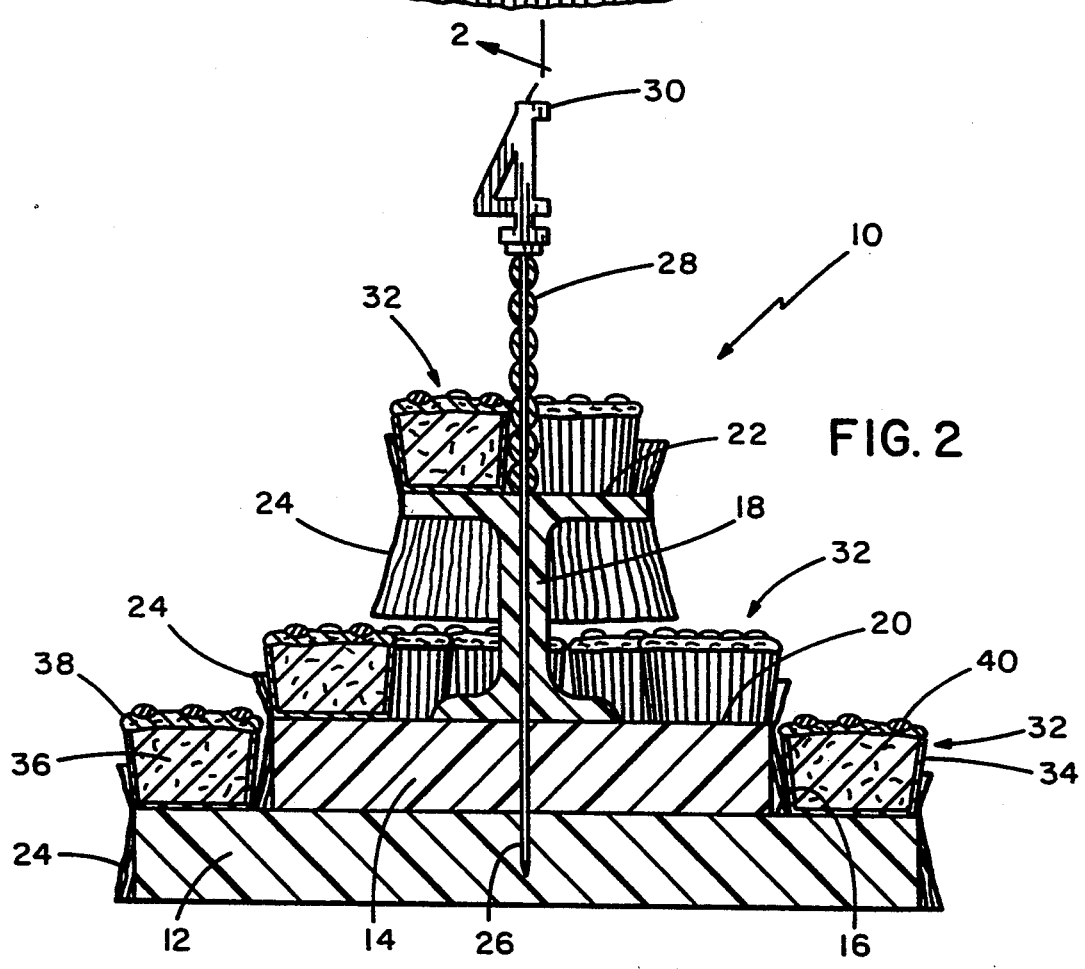
FIG. 2 is a cross-sectional view taken substantially along the line 2—2 of FIG. 1.

Referring now to the drawings, apparatus for serving confectioneries is designated generally by the reference numeral 10 and includes a base support member 12 having a second support member 14 positioned thereon. Preferably these two members 12 and 14 are made of styrofoam and are formed in the shape of round discs each having upper and lower flat surfaces with circular peripheral side walls. The second support member 14 is smaller in diameter than the first support member 12 and defines a first ledge, or tier 16. A third support member 18 is provided in the form of a pedestal and is positioned centrally atop second support member 14. Support member 18 is likewise formed of styrofoam and it is smaller in diameter than second support member 14 thereby defining a second ledge, or tier 20. An upper flat surface of support member 18 defines a third ledge or tier 22. A decorative lace strip 24, known as cake ruffle, is fixed to the sides of each support member 12, 14 and 18 by straight pins. Thus, the sides of the support members 12, 14 and 18 are concealed and their composition cannot be detected. The three support members 12, 14 and 18 are secured together by a wood skewer 26 which may be simply manually pressed through each member 12, 14, and 18. The upper exposed portion of the skewer is decorated with a plurality of jelly candies 28 threadedly received thereon. A candle 30 indicative of the new age of the birthday celebrant is placed on the upper end of the skewer 26.

The support members 12, 14 and 18 are of a standard type found in typical craft shops and they are selected as to size such that tiers 16 and 20 approximate the width of a typical cupcake. Cupcakes 32 may thereby be arranged around the tiers 16 and 20 closely placed with respect to one another to lend the appearance of a layer of cake. Other cupcakes 32 are placed on the third tier 22 to finish the multi-tiered cake-like look. The cupcakes 32 are preferably of conventional type having a paper shell 34 filled with a baked cake portion 36 and topped with icing 38 and candy 40, or the like.

It can be appreciated that the apparatus 10 of the instant invention provides a convenient means for simulating the appearance of an expensive multi-tiered birthday cake but with relative ease and simplicity of assembly. The use of individual cupcakes assembled in a multi-tier arrangement achieves a cake-like simulation while permitting birthday celebrants to conveniently remove a portion of the assembly for consumption with the use of a single hand. Thus, no plates, knives or forks are required for serving. The youngest of birthday celebrants can enjoy a cake portion without having to be waited on and without creating a mess from having difficulty eating from a plate.

Although the illustrated shape of the apparatus 10 is round, other shapes for the support members 12, 14 and 18 may be used to create a non-circular cake-like assembly. While the present invention has been described in connection with particular embodiments thereof, it will be understood by those skilled in the art that many changes may be made without departing from the true spirit and scope of the present invention.

I claim:

1. Apparatus for serving confectioneries comprising:
    a base support member formed from a unitary piece of rigid foam and having an upper surface, a lower surface and a side wall therebetween;

a second support member formed from a unitary piece of rigid foam and having an upper surface, a lower surface and a side wall therebetween, said second support member being similar in plan to said base support member but having a periphery which is smaller in plan than the periphery of said base support member, said second support member being adapted to be positioned directly on top of said base support member with the lower surface of said second support member in intimate contact with the upper surface of said base support member thereby defining a uniformly dimensioned peripheral ledge at the juncture between said base support member and said second support member; and decorative trim means for covering the side walls of said base support member and said second support member, said trim means being adapted to be pinned to said side walls of said support members; said ledge configured to receive a plurality of individual cupcakes closely arranged with respect to one another such that said cupcakes and trim means cooperate to simulate an integral tier of cake.

2. Apparatus according to claim 1 wherein said trim means comprise strips of ruffle.

3. Apparatus according to claim 1 further comprising a skewer for securing said support members together.

4. Apparatus according to claim 3 wherein said skewer supports a candle at the distal end thereof.

5. Apparatus according to claim 1 wherein each support member is circular in plan.

6. A method for simulating a multi-tiered celebration cake comprising the steps of:

providing a first support member having a top surface, a bottom surface and a side wall therebetween, said first support member being formed from a unitary piece of rigid foam;

providing a second support member having a top surface, a bottom surface and a side wall therebetween, said second support member being formed from a unitary piece of rigid foam and being similar in plan to said first support member but having a periphery which is smaller in plan than the periphery of said first support member;

positioning said second support member on the top surface of said first support member with said lower surface of said second support member in intimate contact with said upper surface of said first support member;

centering said second support member on said first support member thereby defining a ledge at the juncture between said support members, said ledge having a uniform width and being sized to accept a plurality of cupcakes thereon;

fixing a strip of decorative trim to the side wall of each support member such that said decorative trim completely covers said side wall; and arranging a plurality of individual cupcakes around the ledge defined by the first and second support members such that said cupcakes and decorative trim cooperate to simulate an integral tier of cake.

7. The method according to claim 6 further comprising the steps of:

providing a skewer; and securing the support members together by pressing the skewer therethrough.

8. The method according to claim 7 further comprising the steps of:

providing a candle; and mounting said candle to the distal end of the skewer.

* * * * *